(12) United States Patent
Imamura et al.

(10) Patent No.: US 8,706,354 B2
(45) Date of Patent: Apr. 22, 2014

(54) ELECTRIC POWER STEERING APPARATUS

(75) Inventors: Yousuke Imamura, Maebashi (JP); Shuji Endo, Maebashi (JP)

(73) Assignee: NSK Ltd., Tokyo (JP)

( * ) Notice: Subject to any disclaimer, the term of this patent is extended or adjusted under 35 U.S.C. 154(b) by 499 days.

(21) Appl. No.: 13/059,104

(22) PCT Filed: Dec. 3, 2010

(86) PCT No.: PCT/JP2010/071672
§ 371 (c)(1), (2), (4) Date: Feb. 15, 2011

(87) PCT Pub. No.: WO2011/077927
PCT Pub. Date: Jun. 30, 2011

(65) Prior Publication Data
US 2011/0264331 A1     Oct. 27, 2011

(30) Foreign Application Priority Data

Dec. 25, 2009 (JP) ................. 2009-294192
Nov. 8, 2010 (JP) ................. 2010-249821

(51) Int. Cl.
*G06F 17/00* (2006.01)
*G06F 19/00* (2011.01)
*B62D 6/00* (2006.01)
*H02P 6/06* (2006.01)

(52) U.S. Cl.
USPC ........ 701/42; 701/29.1; 318/400.09; 318/432

(58) Field of Classification Search
USPC ............ 701/36, 41, 42, 43, 29.1; 318/400.06, 318/400.09, 400.15, 400.23, 400.26, 318/400.27, 432, 629, 720, 722
See application file for complete search history.

(56) References Cited

U.S. PATENT DOCUMENTS 7,161,323 B2 *   1/2007  Ajima et al. ............. 318/629
2006/0001392 A1 *  1/2006  Ajima et al. ............. 318/432

(Continued)

FOREIGN PATENT DOCUMENTS

JP         06051803      2/1994
JP       4045747 B2      9/2002

(Continued)

OTHER PUBLICATIONS

International Search Report of PCT/JP2010/071672 dated Dec. 3, 2010.

*Primary Examiner* — Thomas Tarcza
*Assistant Examiner* — Edward Pipala
(74) *Attorney, Agent, or Firm* — Sughrue Mion, PLLC (57) ABSTRACT

[Problem]

The present invention provides a motor control apparatus that is capable of making the whole system robust not only with respect to motor parameter variations such as the temperature variation and the manufacturing unevenness but also with respect to disturbances and an electric power steering apparatus mounting the motor control apparatus thereon.

[Means for solving the problem]

The motor control apparatus comprises a current detector for detecting a current of a motor and a controller for deciding a voltage command value based on at least a current command value, the controller comprises an adaptive identifying means for identifying parameter variations of an output model of the motor, a current estimating means for estimating a current of the motor, and a voltage command value deciding means for deciding the voltage command value, and the adaptive identifying means performs the identification based on at least a current detection value detected by the current detector and a current-estimate value calculated by the current estimating means, the current estimating means calculates the current-estimate value based on at least a result of the identification and the voltage command value, the voltage command value deciding means decides the voltage command value based on the current command value and the current-estimate value.

8 Claims, 10 Drawing Sheets

(56) References Cited

U.S. PATENT DOCUMENTS

2007/0035272 A1* 2/2007 Hattori et al. ............... 318/823
2007/0296375 A1* 12/2007 Sakaguchi et al. ........... 318/811

FOREIGN PATENT DOCUMENTS

| | | |
|---|---|---|
| JP | 2003143896 | 5/2003 |
| JP | 2009-526511 A | 7/2009 |

* cited by examiner

REVOLUTION SPEED-SENSITIVE AND OBSERVER RESPONSE SETTING

FIG.12

ELECTRIC POWER STEERING APPARATUS

CROSS REFERENCE TO RELATED APPLICATIONS

This application is a National Stage of International Application No. PCT/JP2010/071672 filed Dec. 3, 2010, claiming priority based on Japanese Patent Application No. 2009-294192 filed Dec. 25, 2009 and Japanese Patent Application No. 2010-249821 filed on Nov. 8, 2010, the contents of all of which are incorporated herein by reference in their entirety.

TECHNICAL FIELD

The present invention relates to a motor control apparatus that has an adaptive identification mechanism to estimate a current of a motor and an electric power steering apparatus mounting the motor control apparatus thereon.

BACKGROUND ART

Figure 1:
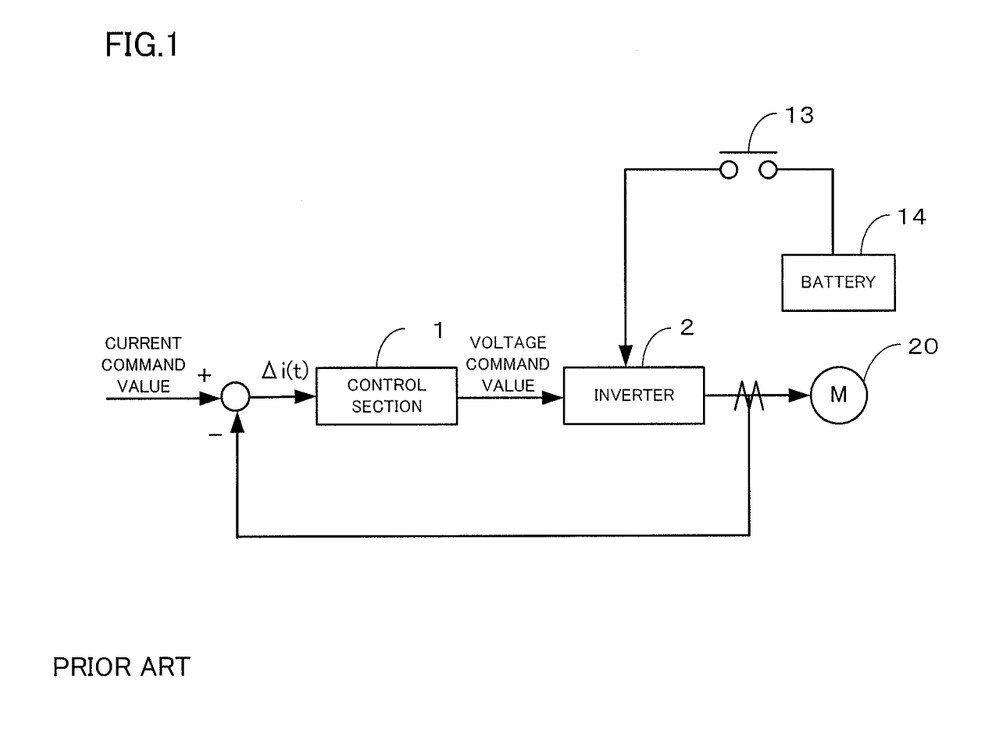
FIG. 1 is a block diagram illustrating an example of a conventional motor control apparatus.

Heretofore, as shown in FIG. 1, a general configuration of a motor control section of an electric power steering apparatus is such a configuration that, based on a deviation Δi(t) between a current command value calculated by such as a steering torque and a velocity and a motor current detection value that is fed back, a voltage command value is calculated by means of a control section 1 such as a proportional (P) control, a proportional-integral (PI) control, or a proportional-integral-differential (PID) control, and in accordance with the calculated voltage command value, a motor 20 is driven through an inverter. Electric power is supplied from a battery 14 to the inverter 2 through a power relay 13. However, in such a control system, since trying not to output influences of detection disturbances of the motor current detection value, it is impossible to enhance a control response very much, and a limitation is imposed on suppression of parameter variations of the motor 20 and an ECU (Electronic Control Unit) and disturbances of a motor input voltage. Therefore, in order to obtain a highly-robust control method with high response while suppressing the influences of the detection disturbances of the motor current detection value, in general, a method that mitigates influences of current detection noises to some extent by setting the current detection value used in current control as an estimation current and thereby enhances a response of the current control and improves operation sound performance and torque ripple performance, is thought about.

In Patent Document 1, a method and an apparatus that inputs dq-axis voltage command values of a vector control, calculates dq-axis estimation currents by means of a dq-axis current observer and performs a feedback control, are disclosed. In the method and the apparatus, a scheme that enhances robustness by making each parameter of a current observer model dependent on temperature detection value of each element and varying, is proposed. Further, in Patent Document 2, a motor control apparatus that estimates a motor current vale after several samples based on a voltage command value, a motor current detection value and input estimation disturbances of a motor that is estimated by a disturbance observer, uses the motor current-estimate value in control, and a current observer corresponds to a variation in the model parameters by a state feedback, is proposed.

THE LIST OF PRIOR ART DOCUMENTS

Patent Documents

Patent Document 1: Japanese Patent Application (Translation of Pct Application) Laid-open No. 2009-526511
Patent Document 2: Japanese Patent No. 4045747

SUMMARY OF THE INVENTION

Problems to be Solved by the Invention

However, the variation in each parameter of the motor includes not only a temperature variation but also a variation due to a current pathway variation that is caused by manufacturing unevenness, aging degradation and current regeneration etc., by using the control method disclosed in the Patent Document 1 that corrects only the temperature, there is a problem that it is not enough to keep an estimation precision. Further, in the apparatus disclosed in the Patent Document 2, current detection disturbances that do not become a real motor current, are included in the disturbances estimated by the disturbance observer. Since the estimation current is in conformity with a value that the current detection disturbances are included in, there is a problem that with respect to the current detection disturbances, the whole control system does not become robust.

With respect to the above problems, although it is thought that it is possible to decreases a state feedback gain and lowers a natural response frequency of the observer by using the configuration of the Patent Document 2 so that the current detection disturbances are not calculated as estimate values, since a response with respect to parameter variations of an estimating subject model also drops simultaneously, it is also thought that there is a problem that errors of the estimation current broaden.

The present invention has been developed in view of the above described circumstances, and an object of the present invention is to provide a motor control apparatus that is capable of making the whole system robust not only with respect to motor parameter variations such as the temperature variation and the manufacturing unevenness but also with respect to disturbances and an electric power steering apparatus mounting the motor control apparatus thereon.

Means for Solving the Problems

The present invention relates to a motor control apparatus comprising a current detector for detecting a current of a motor, and a controller for deciding a voltage command value based on at least a current command value, the above-described object of the present invention is achieved by that said controller comprising an adaptive identifying means for identifying parameter variations of an output model of said motor, a current estimating means for estimating a current of said motor, and a voltage command value deciding means for deciding said voltage command value, and said adaptive identifying means performs said identification based on at least a current detection value detected by said current detector and a current-estimate value calculated by said current estimating means, said current estimating means calculates said current-estimate value based on at least a result of said identification and said voltage command value, said voltage command value deciding means decides said voltage command value based on said current command value and said current-estimate value.

Further, the above-described object of the present invention is achieved by that said controller further includes a current detection state determining means for determining whether a current detection of said motor by said current detector is possible or not, in a case that said current detection state determining means determines said current detection is impossible, said identification of said adaptive identifying means is terminated temporarily. In this way, an additional effect that the object can be achieved even the current detection becomes impossible temporarily, is obtained.

Further, the above-described object of the present invention is achieved by that said controller further includes an inverter for driving said motor based on said voltage command value, a current detection method of said motor is a 1-shunt current detection method that arranges a single said current detector at an upper stage or a lower stage of said inverter, said current detection state determining means determines whether said current detection of said motor is possible or not based on at least Duty-command values.

Further, the above-described object of the present invention is more effectively achieved by that parameters of said voltage command value deciding means are varied based on said result of said identification of said adaptive identifying means. Further, the above-described object of the present invention is more effectively achieved by that responses of said adaptive identifying means and said current estimating means are varied based on an operation state of said motor.

Moreover, the present invention relates to an electric power steering apparatus, the above-described object of the present invention is achieved by mounting the above-described motor control apparatus thereon.

Effects of the Invention

Since the present invention identifies sequentially parameters of a motor model by means of an adaptive identifying section, estimates a motor current by using parameter identification results of the adaptive identifying section and becomes a robust configuration with respect to the motor parameter variations such as the temperature variation and the manufacturing unevenness, it is possible to enhance the estimation precision and improve the operation sound performance and the torque ripple performance more effectively than the conventional technology.

Further, the present invention varies responses of the adaptive identifying section and a current estimating section based on the operation state of the motor, by varying the responses to a level that influences of the current detection disturbances are not outputted (or it is possible to suppress the influences) as the estimate values in an operation state that the influences of the current detection disturbances appear greatly such as a steering-holding state, it is possible to suppress the current detection disturbances with respect to the estimation current used in deciding the voltage command value, it is possible to increase the responses with an easy current control configuration, and further it is possible to improve the operation sound performance and the torque ripple performance.

Moreover, in the case that the current detection becomes impossible, by temporarily terminating calculation of the adaptive identifying section, even the current detection becomes impossible temporarily due to failures of a current detector, by calculating the estimation current based on identification results before the current detection become impossible, it is possible to maintain the motor control.

Still further, in general, in the case that detection method of the motor current is a downstream 1-shunt current detection method, in a state that it is impossible to detect a phase current in accordance with Duty (duty ratio) in a PWM (Pulse Width Modulation)-control, that is, in a state that the current detection becomes impossible temporarily, since driving the motor by limiting the Duty to a range not becoming a current detection impossible state, it is impossible to fully use an original output characteristic (rated output). However, according to the present invention, determining whether the current detection is possible by using information such as the Duty or not, in the case of determining that the current detection is impossible, terminating the adaptive identifying operation temporarily, calculating the estimation current based on the identification results before the current detection become impossible, and maintaining the motor control, thereby it is possible to fully use motor output characteristics without limiting the Duty and so on.

MODE FOR CARRYING OUT THE INVENTION

Hereinafter, each embodiment of a motor control apparatus according to the present invention will be described in detail with reference to the drawings.

First Embodiment

Figure 2:
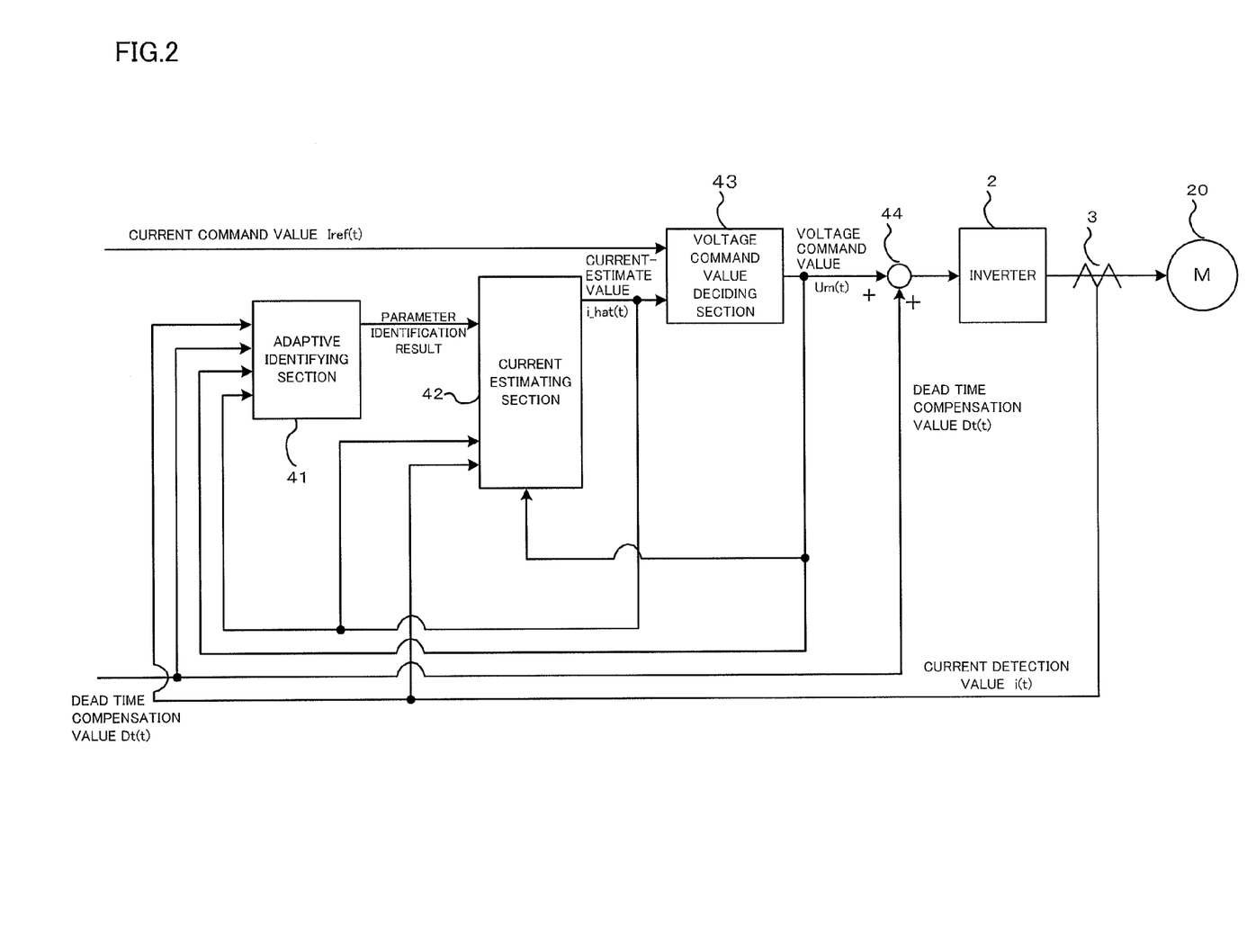
FIG. 2 is a schematic block diagram showing a configuration of a motor control apparatus according to the first embodiment of the present invention.

FIG. 2 is a schematic block diagram showing a configuration of a motor control apparatus according to the first embodiment of the present invention. The motor control apparatus of this embodiment comprises an adaptive identifying section 41, a current estimating section 42, a voltage command value deciding section 43 and an adding section 44.

The adaptive identifying section 41 inputs a current detection value i(t), a current-estimate value i_hat(t), a voltage command value Um(t) and a dead time compensation value Dt(t), and identifies a variation in each parameter of a motor output model based on an adaptive identification rule. In this way, cancelling influences of variations in electrical characteristic parameters of the motor due to temperature variation, manufacturing unevenness, aging degradation and so on, and improving a current-estimation precision. Moreover, as the adaptive identification rule used in the adaptive identifying section 41, although there are various identification rules such as an integral-type adaptive identification rule, a proportional-integral-type adaptive identification rule, a least square adaptive identification rule or a direct identification method using a state variable filter, if it is possible to identify the variation in each parameter of the output model of the motor 20, it is possible to use any one of them.

The current estimating section 42 inputs identification results of each parameter that are identified by means of the adaptive identifying section 41, the current-estimate value i_hat(t), the current detection value i(t) and the voltage command value Um(t) to estimate a current that flows in the motor 20, and calculates the current-estimate value i_hat(t).

The voltage command value deciding section 43 inputs a current command value Iref(t) and the current-estimate value i_hat(t), and calculates the voltage command value Um(t) so that the motor current becomes the current command value Iref(t).

The adding section 44 adds the dead time compensation value Dt(t) to the voltage command value Um(t) calculated in the voltage command value deciding section 43, inputs the adding result to the inverter 2, and the inverter 2 drives the motor 20.

In such a configuration, without performing a control using the current detection value i(t) as the normal feedback control, since performing the feedforward control by using the calculated current-estimate value i_hat(t), it is hard to be affected by input disturbances such as current detection noises. In this way, it is possible to use a simple control method, and it is possible to enhance control responses and improve the operation sound performance and the torque ripple performance.

Hereinafter, as an example, a concrete configuration of the motor control apparatus according to the first embodiment that the adaptive identifying section 41 uses the integral-type adaptive identification rule and the current estimating section 42 comprises a state feedback section 428, will be described.

With respect to the motor 20 that is a control subject, when setting the input as a voltage Vm and setting the output as a current $i_m$, an electrical characteristic equation becomes an equation as shown in the following Expression 1.

$$V_m(t) = R_m i_m(t) + L_m \frac{d}{dt} i_m(t) \quad \text{[Expression 1]}$$

where,
$V_m(t)$: an applied voltage between single-phase coils,
$i_m(t)$: a current,
$R_m$: a resistance of a single-phase coil, and
$L_m$: an inductance of a single-phase coil.

Here, the applied voltage $V_m(t)$ between single-phase coils is a voltage that is generated by the PWM and applied to the motor 20 after the voltage command value Um(t) is converted into the Duty based on an ECU-input voltage detection value $V_r(t)$ and added to the dead time compensation value Dt(t) that compensates a dead time characteristic of the inverter 2. When setting a detection error of an ECU-input voltage as $\Delta_v V_r(t)$, and setting a dead time compensation error as $\Delta_d D_t(t)$ because the dead time compensation value is different from the real value of the dead time, the following Expression 2 holds.

$$\frac{u_m(t)}{Vr(t)} + Dt(t) = \text{Duty}(t) \quad \text{[Expression 2]}$$

$$[\text{Duty}(t) - (\Delta_d Dt(t) + Dt(t))] \cdot (\Delta_V Vr(t) + Vr(t)) = V_m(t)$$

When eliminating the Duty by using the above Expression 2, the following Expression 3 is obtained.

$$V_m(t) = (1+\Delta_v)[u_m(t) - (\Delta_d \cdot V_r)Dt(t)] \quad \text{[Expression 3]}$$

By substituting the above Expression 3 into the above Expression 1 and solving with respect to a differential value of the current $i_m$, the following Expression 4 is obtained.

$$\frac{d}{dt} i_m(t) = -\frac{R_m}{L_m} i_m(t) + \frac{(1+\Delta_V)}{L_m}(u_m(t) - (\Delta_d \times Vr)Dt(t)) \quad \text{[Expression 4]}$$

Here, by setting a state "$x_m(t) = i_m(t)$" and an output "$y_m(t) = x_m(t)$", it is possible to derive a motor continuous-time state equation represented by the following Expression 5.

$$\begin{cases} \frac{d}{dt} x_m(t) = A_m x_m(t) + B_m(u_m(t) + \Delta ev \times Dt(t)) \\ y_m(t) = C_m x_m(t) \end{cases} \quad \text{[Expression 5]}$$

$$A_m = -\frac{R_m}{L_m}$$

$$B_m = \frac{(1+\Delta_V)}{L_m}$$

$$C_m = 1$$

$$\Delta ev = \Delta_d \times Vr$$

With respect to the above expression 5, it is thought to configure the current estimating section 42 that estimates the motor current so as to realize the following Expression 6.

$$\begin{cases} \frac{d}{dt} \hat{x}(t) = A\hat{x}(t) + Bu(t) \\ \hat{y}(t) = C\hat{x}(t) \end{cases} \quad \text{[Expression 6]}$$

$$A = -\frac{R}{L} < 0, \ B = \frac{1}{L} > 0, \ C = 1$$

where, $\hat{x}(t), \hat{y}(t)$: current-estimate values, u(t): a control input, R: a nominal resistance value, and L: a nominal inductance value.

By defining that a current estimation error e(t) is a difference between the current-estimate value and the motor current detection value, the following Expression 7 is obtained.

$$e(t) = \hat{y}(t) - y_m(t) = \hat{x}(t) - x_m(t) \quad \text{[Expression 7]}$$

Then, by converting the Expression 7 into an integral equation, that is, by substituting the above Expression 5 and Expression 6 into the Expression 7, the following Expression 8 is obtained.

$$\frac{d}{dt}e(t) = \frac{d}{dt}\hat{x}(t) - \frac{d}{dt}x_m(t) \quad \text{[Expression 8]}$$
$$= A\hat{x}(t)Bu(t) - A_m x_m(t) -$$
$$B_m u_m(t) - B_m \Delta ev \times Dt(t)$$
$$= Ae(t) + (A - A_m)x_m(t) - B_m u_m(t) -$$
$$B_m \Delta ev \times Dt(t) + Bu(t)$$

The first term of the right-hand side of the above Expression 8 is an error convergence term, because "A<0" holds. The second term to the fourth term of the right-hand side of the Expression 8 are terms that represent estimation errors, and the fifth term is a control input term. In accordance with the Expression 8, the control input u(t) is set as Expression 9.

$$u(t) = Ke \cdot e(t) + K_x(t) \cdot x_m(t) + K_u(t) \cdot u_m(t) + K_{dt}(t) \cdot Dt(t) \quad \text{[Expression 9]}$$

where,

Ke: a state feedback gain that establishes a natural response frequency of the current estimating section with respect to the estimation error (is also a gain that absorbs modelization errors and establishes stability of the adaptive identification), $K_x(t)$: an adaptive identification gain for suppressing the influence of the second term of the Expression 8, $K_u(t)$: an adaptive identification gain for suppressing the influence of the third term of the Expression 8, and $K_{dt}(t)$: an adaptive identification gain for suppressing the influence of the fourth term of the Expression 8.

By substituting the above Expression 9 into the above Expression 8, an estimation error equation represented by the following Expression 10 is obtained.

$$\frac{d}{dt}e(t) = (A + BKe)e(t) + B\left[K_x(t) - \frac{A_m - A}{B}\right]x_m(t) + \quad \text{[Expression 10]}$$
$$B\left[K_u(t) - \frac{B_m}{B}\right]u_m(t) + B\left[K_{dt}(t) - \frac{B_m \Delta ev}{B}\right]Dt(t)$$

By calculating adaptive identification gains of the second term, the third term and the fourth term of the right-hand side of the above Expression 10 that represent the estimation errors based on the following Expression 11, the second term, the third term and the fourth term of the right-hand side become "0", since only the first term that is the error convergence term remains, the estimation error converges on "0".

$$K_x(t) = \frac{A_m - A}{B} = S_x \quad \text{[Expression 11]}$$
$$K_u(t) = \frac{B_m}{B} = S_u$$
$$K_{dt}(t) = \frac{B_m \Delta ev}{B} = S_{dt}$$

Here, identifying calculations of the adaptive identification gains Kx, Ku and Kdt are derived by using the Lyapunov stability theory. The Lyapunov stability theory is a method that establishes a certain positive-definite function (the solution is certainly more than or equal to "0") as a Lyapunov function V, and derives the solution by using that the Lyapunov function converges on "0" when a derivation dV/dt of the Lyapunov function V becomes less than or equal to zero. As a candidate of the Lyapunov function, a positive-definite function represented by the following Expression 12 is chosen.

$$V = e(t)^2 + B\Gamma_x^{-1}[K_x(t) - S_x]^2 + B\Gamma_u^{-1}[K_u(t) - S_u]^2 + B\Gamma_{dt}^{-1}[K_{dt}(t) - S_{dt}]^2 \quad \text{[Expression 12]}$$

where, $\Gamma_x$, $\Gamma_u$ and $\Gamma_{dt}$ are positive definite values (values that are more than or equal to zero). The first term is a term that represents convergence of the current estimation error. The second term, the third term and the fourth term are terms that represent convergences to true values of the adaptive identification gains Kx, Ku and Kdt.

By calculating the derivation of the Expression 12 and substituting the above Expression 10, the following Expression 13 is obtained.

$$\frac{d}{dt} = 2e(t) \cdot \frac{d}{dt}e(t) + 2B\Gamma_x^{-1}[K_x(t) - S_x] \cdot \frac{d}{dt}K_x(t) + \quad \text{[Expression 13]}$$
$$2B\Gamma_u^{-1}[K_u(t) - S_u] \cdot \frac{d}{dt}K_u(t) +$$
$$2B\Gamma_{dt}^{-1}[K_{dt}(t) - S_{dt}] \cdot \frac{d}{dt}K_{dt}(t)$$
$$= 2(A + BKe)e(t)^2 + 2B[K_x(t) - S_x]x_m(t) \cdot e(t) +$$
$$2B\Gamma_x^{-1}[K_x(t) - S_x] \cdot \frac{d}{dt}K_x(t) +$$
$$2B[K_x(t) - S_x]u_m(t) \cdot e(t) + 2B\Gamma_u^{-1}[K_u(t) - S_u] \cdot$$
$$\frac{d}{dt}K_u(t) + 2B[K_{dt}(t) - S_{dt}]Dt(t) \cdot e(t) +$$
$$2B\Gamma_{dt}^{-1}[K_{dt}(t) - S_{dt}] \cdot \frac{d}{dt}K_{dt}(t)$$

Based on the above Expression 13, calculating the state feedback gain Ke and the adaptive identification gains Kx, Ku and Kdt (that is, configuring the adaptive identifying section 41 and the current estimating section 42) is performed as the following Expression 14.

[Expression 14]

$$Ke < 0$$

$$\begin{cases} K_x(t) = -\frac{1}{s}\Gamma_x x_m(t) \cdot e(t) \\ K_u(t) = -\frac{1}{s}\Gamma_u u_m(t) \cdot e(t) \\ K_{dt}(t) = -\frac{1}{s}\Gamma_{dt} Dt(t) \cdot e(t) \end{cases} \Rightarrow \begin{cases} \frac{d}{dt}K_x(t) = -\Gamma_x x_m(t) \cdot e(t) \\ \frac{d}{dt}K_u(t) = -\Gamma_u u_m(t) \cdot e(t) \\ \frac{d}{dt}L_{dt}(t) = -\Gamma_{dt} Dt(t) \cdot e(t) \end{cases}$$

In general, an adaptive identification rule such as the Expression 14 is referred to as an integral-type adaptive identification rule. $\Gamma_x$, $\Gamma_u$ and $\Gamma_{dt}$ are positive definite value gains, since deciding identification sensitivities (speeds) of the adaptive identification gains Kx, Ku and Kdt, hereinafter referred to as identification sensitivity gains. By setting the identification sensitivity gains $\Gamma_x$, $\Gamma_u$ and $\Gamma_{dt}$ as the Expression 14, the derivation of the Lyapunov function becomes the following Expression 15.

$$\frac{d}{dt}V = 2(A + BKe)e(t)^2 \qquad \text{[Expression 15]}$$

Here, since "A<0", "B>0" and "Ke<0" hold, becoming "dV/dt<0", the Lyapunov function V converges on zero. That is, the current estimation error e(t) converges on zero, and the adaptive identification gains Kx, Ku and Kdt converge on true values.

As described above, finally, it is possible to configure the adaptive identifying section 41 and the current estimating section 42 in accordance with the following Expression 16.

the current estimating section: [Expression 16]

$$\begin{cases} \frac{d}{dt}\hat{x}(t) = A\hat{x}(t) + Bu(t) \\ \hat{y}(t) = C\hat{x}(t) \end{cases}$$

$$\left(A = -\frac{R}{L}, B = \frac{1}{L}, C = 1\right)$$

the control input:

$u(t) = Ke \cdot e(t) + K_x(t) \cdot x_m(t) + K_u(t) \cdot u_m(t) + K_{dt}(t) \cdot Dt(t)$
  $(Ke<0)$ $e(t) = \hat{y}(t) - y_m(t) = \hat{x}(t) - x_m(t)$ the adaptive identifying section:

$$\begin{cases} K_x(t) = -\frac{1}{s}\Gamma_x x_m(t) \cdot e(t) \\ K_u(t) = -\frac{1}{s}\Gamma_u u_m(t) \cdot e(t) \quad (\Gamma_x > 0, \Gamma_u > 0, \Gamma_{dt} > 0) \\ K_{dt}(t) = -\frac{1}{s}\Gamma_{dt} Dt(t) \cdot e(t) \end{cases}$$

where,
$\hat{y}(t) = \hat{x}(t) = \hat{i}(t)$: the current-estimate value,
$x_m(t) = i(t)$: the current detection value, and
$e(t) = \hat{i}(t) - i(t)$: the current estimation error.

Figure 3:
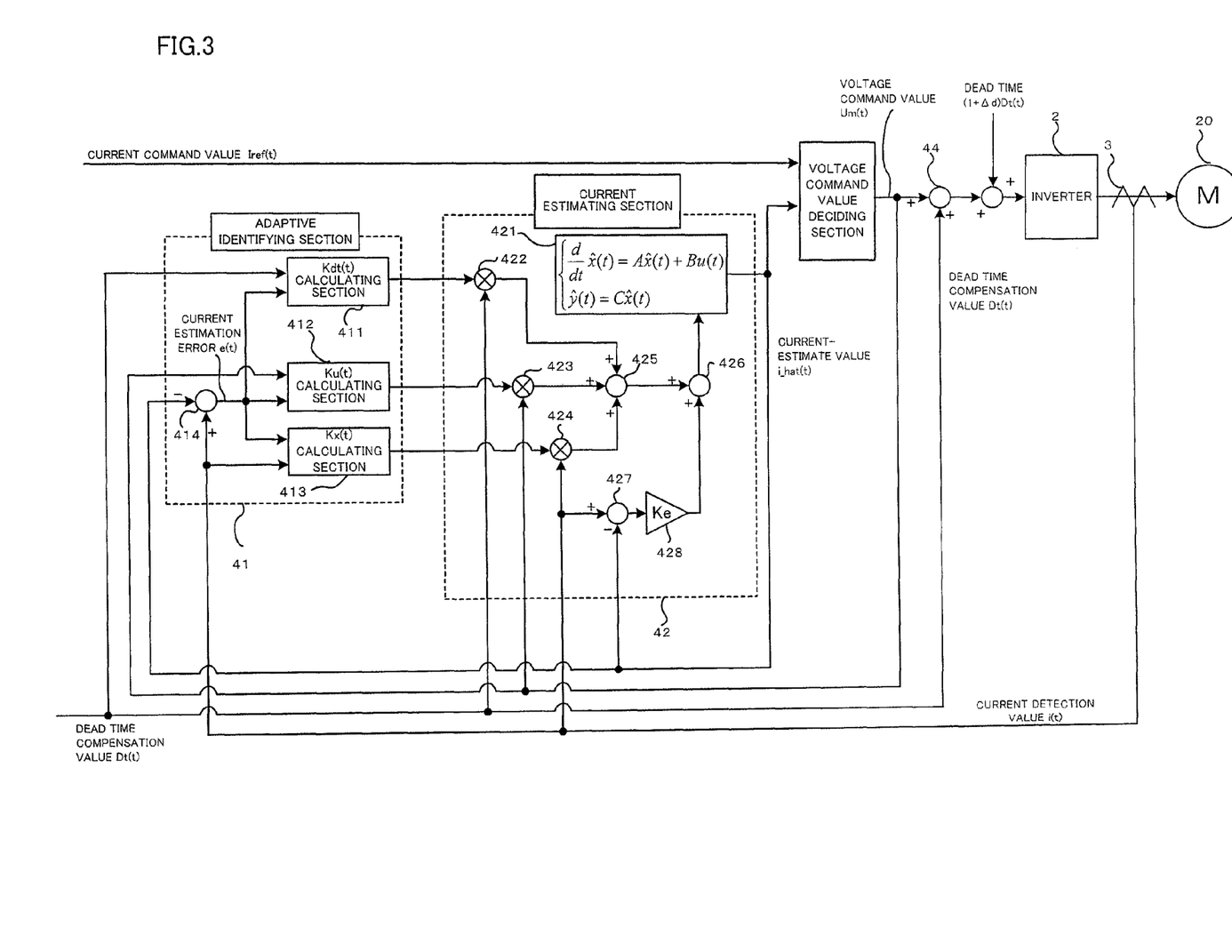
FIG. 3 is a block diagram showing an example of the motor control apparatus according to the first embodiment of the present invention.

FIG. 3 is a block diagram showing an example of the motor control apparatus comprising the adaptive identifying section 41 and the current estimating section 42 that are defined by the Expression 16. The adaptive identifying section 41 uses the integral-type adaptive identification rule represented by the Expression 16 as its adaptive identification rule, and comprises an adaptive identification gain Kdt(t) calculating section 411 that inputs the dead time compensation value Dt(t) and the current estimation error e(t), an adaptive identification gain Ku(t) calculating section 412 that inputs the voltage command value Um(t) and the current estimation error e(t), an adaptive identification gain Kx(t) calculating section 413 that inputs the motor current detection value i(t) and the current estimation error e(t), and a subtracting section 414 that calculates the current estimation error e(t) by subtracting the current-estimate value i_hat(t) from the motor current detection value i(t).

The current estimating section 42 comprises a multiplying section 422, a multiplying section 423, a multiplying section 424, an adding section 425, a subtracting section 427, a state feedback section 428, an addition section 426 and a motor characteristic section 421. The multiplying section 422 multiplies the dead time compensation value Dt(t) by the output of the adaptive identification gain Kdt(t) calculating section 411. The multiplying section 423 multiplies the voltage command value Um(t) by the output of the adaptive identification gain Ku(t) calculating section 412. The multiplying section 424 multiplies the motor current detection value i(t) by the output of the adaptive identification gain Kx(t) calculating section 413. The adding section 425 adds multiplication results of the multiplying sections 422, 423 and 424. The subtracting section 427 subtracts the current-estimate value i_hat(t) from the motor current detection value i(t) to calculate the current estimation error e(t). The state feedback section 428 inputs the current estimation error e(t) and feeds back with the state feedback gain Ke. The addition section 426 adds a feedback value outputted from the state feedback section 428 to an additional value of the multiplication results of the multiplying sections 422, 423 and 424 calculated by the adding section 425. The motor characteristic section 421 inputs an addition result of the addition section 426 and calculates the current-estimate value i_hat(t) by using an output model of the motor 20 that is defined by the Expression 16.

Next, settings of the identification sensitivity gains $\Gamma_x$, $\Gamma_u$ and $\Gamma_{dt}$ will be described. Values of the identification sensitivity gains $\Gamma_x$, $\Gamma_u$ and $\Gamma_{dt}$ are values that control the response of the adaptive identifying section 41, and it is possible to arbitrarily determine the values of the identification sensitivity gains $\Gamma_x$, $\Gamma_u$ and $\Gamma_{dt}$. In general, it is possible to determine the adaptive identification gains Kx, Ku and Kdt so that the adaptive identification gains Kx, Ku and Kdt asymptotically stabilize (converge) within a desired time. However, when setting all of the identification sensitivity gains $\Gamma_x$, $\Gamma_u$ and $\Gamma_{dt}$ as the same value, poles of adaptive identifications become identical, thereby there is a possibility to become an interference state each other. Therefore, it is preferred to set the identification sensitivity gains $\Gamma_x$, $\Gamma_u$ and $\Gamma_{dt}$ as different values, as an example, it is possible to determine a relation between the different values so that as variation widths of elements to identify become large, corresponding identification sensitivity gains $\Gamma_x$, $\Gamma_u$ and $\Gamma_{dt}$ are set highly.

Further, the adaptive identification gains Kx, Ku and Kdt show the motor parameter variation width correlatively. The motor parameter variations also vary with the temperature except for the initial unevenness such as the manufacturing unevenness and the aging degradation. Considering the above matter and in order to realize that convergence times of the adaptive identification gains Kx, Ku and Kdt are not affected by the current detection disturbances, it is preferred to set the adaptive identification gains Kx, Ku and Kdt so as to become late with respect to an electrical time constant of the motor (for example, about 1 second).

Next, setting of the state feedback gain Ke will be described. Since by the adaptive identification, the motor output model from the applied voltage to the current becomes identical with the real motor characteristic, with respect to the modelized element, the response of the current-estimate value i_hat(t) for the applied voltage becomes a very high response. Further, since the adaptive identification time is set so as to become late with respect to the electrical time constant, it is preferred to set the state feedback gain Ke that stabilizes the adaptive identification system small.

As described above, since the state feedback gain Ke also has a meaning to set the natural response frequency of the current estimating section 42 for the modelization error, when setting the state feedback gain Ke high, since there is a possibility to become following so as to become highly-sensitive even with respect to the detection disturbances, it is not preferred to set the state feedback gain Ke high. In contrast, by setting the state feedback gain Ke small and setting the natural response frequency small, it is possible to make the current detection disturbances are not sensed and improve the robustness of the whole control system.

Further, although the dead time compensation value Dt(t) is inputted to the adaptive identifying section 41 and the current estimating section 42, the present invention is not limited to that, for example, as the sign of the dead time compensation value Dt(t), it could be a dead time equivalent value that includes at least a potential variation direction information within the dead time, moreover, in the case that the influence of the dead time is small, it is also good that there is no inputting of the dead time compensation value Dt(t) and no the adaptive identification element relating to the dead time.

Moreover, although the modelization error of the current estimating section 42 is considered and the state feedback section 428 is provided, the present invention is not limited to that, in the case that the influence of the modelization error is small, it is also good that there is no the state feedback section 428.

Moreover, in the motor parameter variations, the variation in the parameter relating to the resistance value is the largest, and the variation in the inductance component and the variation in the ECU-input voltage are small. For this reason, it is also possible to configure the adaptive identifying section only by the variation in the parameter relating to the resistance, i.e. the adaptive identification gain Kx(t).

Figure 4:
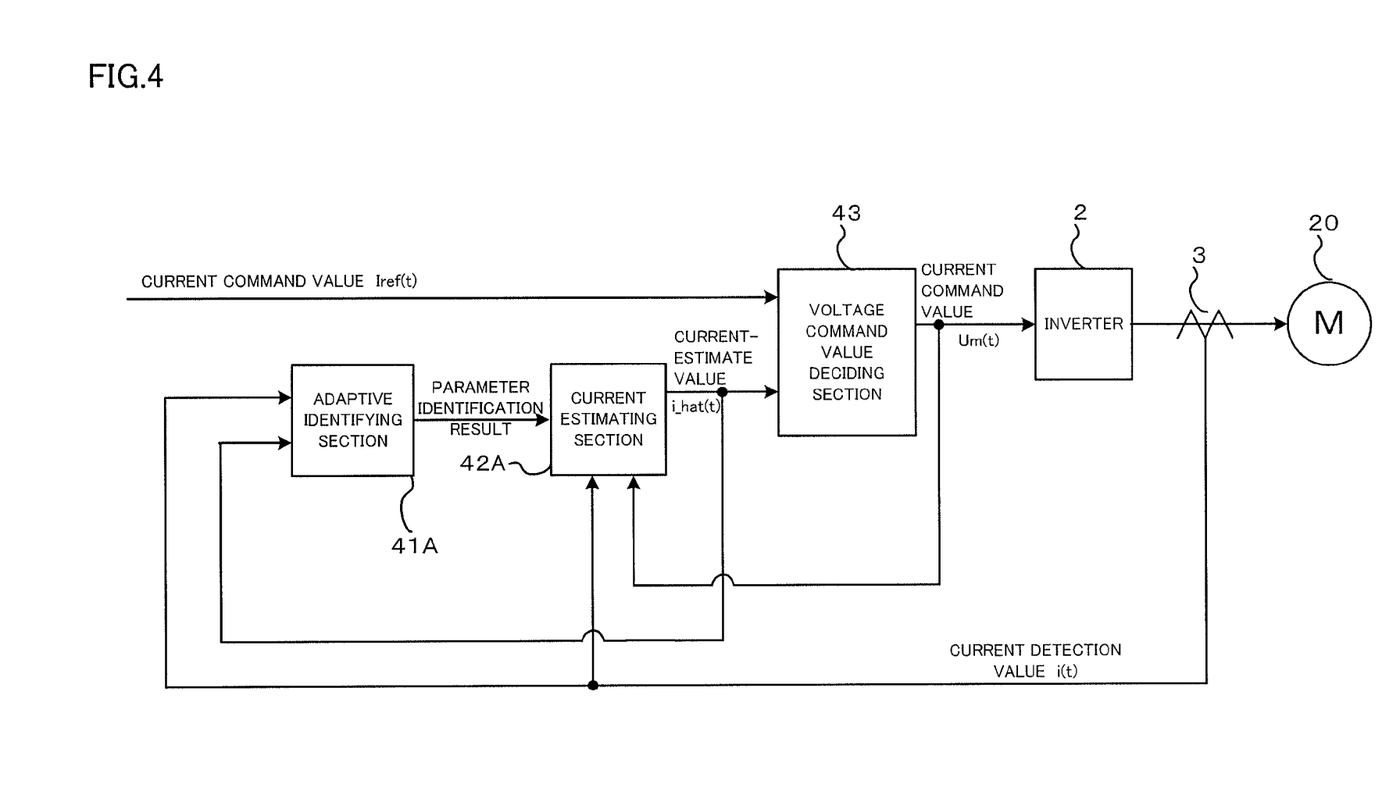
FIG. 4 is a schematic block diagram showing another example of the motor control apparatus according to the first embodiment of the present invention.

In the case that the adaptive identifying section 41 is configured only by the variation in the parameter relating to the resistance and the state feedback section 428 is not comprised, the configuration of the motor control apparatus becomes a configuration as shown in FIG. 4, and configurations of an adaptive identifying section 41A and a current estimating section 42A become the following Expression 17.

the current estimating section: [Expression 17]

$$\begin{cases} \frac{d}{dt}\hat{x}(t) = A\hat{x}(t) + Bu(t) \\ \hat{y}(t) = C\hat{x}(t) \end{cases}$$

$$\left(A = -\frac{R}{L}, B = \frac{1}{L}, C = 1\right)$$

the adaptive identifying section:

$$K_x(t) = -\frac{1}{s}\Gamma_x x_m(t) \cdot e(t) \; (\Gamma_x > 0)$$

where,
$\hat{y}(t) = \hat{x}(t) = \hat{i}(t)$: the current-estimate value,
$x_m(t) = i(t)$: the current detection value, and
$e(t) = \hat{i}(t) - i(t)$: the current estimation error.

Moreover, in the case of using an identification rule that directly identifies the parameter itself of the motor 20 (for example, a direct identification method using a state variable filter) as the adaptive identification rule of the adaptive identifying section 41, since it is possible to directly rewrite coefficients A and B of the current estimating section 42, it is possible to estimate the current-estimate value i_hat(t) only by the parameter identification result and the voltage command value Um(t).

Second Embodiment

Usage states of the electric power steering apparatus are various, in the case of the motor control apparatus according to the above-described first embodiment, depending on the usage state, the influence on the adaptive identifying section 41 and the current estimating section 42 varies. For example, in a low-speed steering state, there is a problem that a person who steers feels torque vibrations caused by current detection noises easily, and responses of the adaptive identifying section 41 and the current estimating section 42 become high-sensitive. Further, in a high-speed steering state, since the influence of an EMF-compensation error (the model error) that is not modelized becomes large, there is a problem that the current-estimation precision drops and the torque ripple comes to occur easily, that is, the response of the current estimating section 42 becomes insufficient. Further, in a low-current state such as the vicinity of the center of the steering wheel, since the current estimation error e(t) becomes small, there is a possibility that the adaptive identification speed drops and the torque ripple occurs at the time of beginning to turn the steering wheel, that is, there is a problem that the response of the adaptive identifying section 41 becomes insufficient. Moreover, in a regeneration mode that the motor torque and the rotational direction invert such as a return to a neutral steering state, since the impedance model seems to vary depending on the variation in the motor current pathway within the inverter 2, there is a problem that abrupt parameter variations occur and the response of the adaptive identifying section 41 becomes insufficient.

Figure 5:
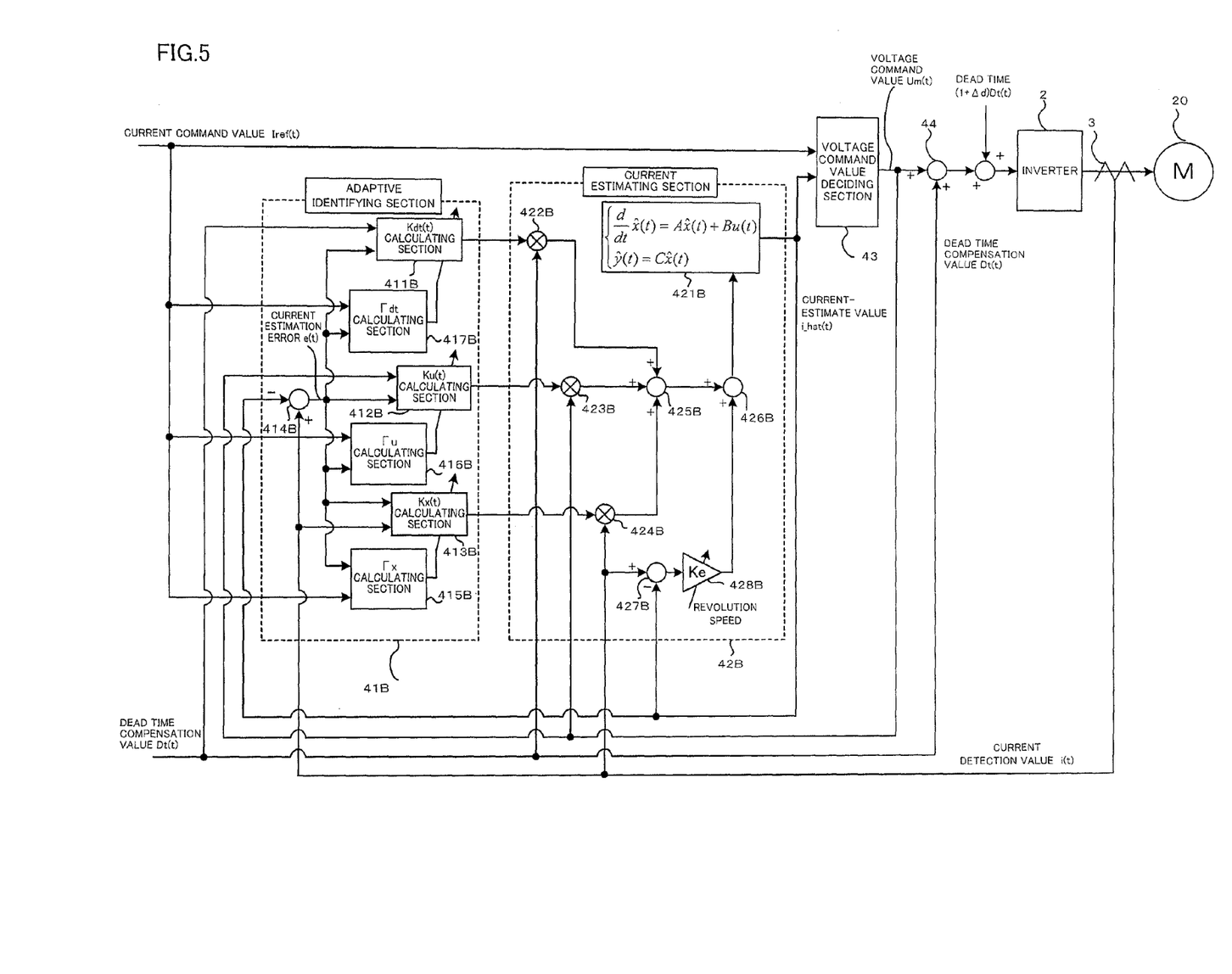
FIG. 5 is a block diagram showing an example of a motor control apparatus according to the second embodiment of the present invention.

In order to solve the above-described problems, as shown in FIG. 5 corresponding to FIG. 3, a motor control apparatus according to the second embodiment varies responses of an adaptive identifying section 41B and a current estimating section 42B in accordance with the operation state of the motor 20. In this way, it is possible to choose the optimal response for various states, and it is possible to prevent the drop of the current-estimation precision and obtain a good control effect.

Figure 6:
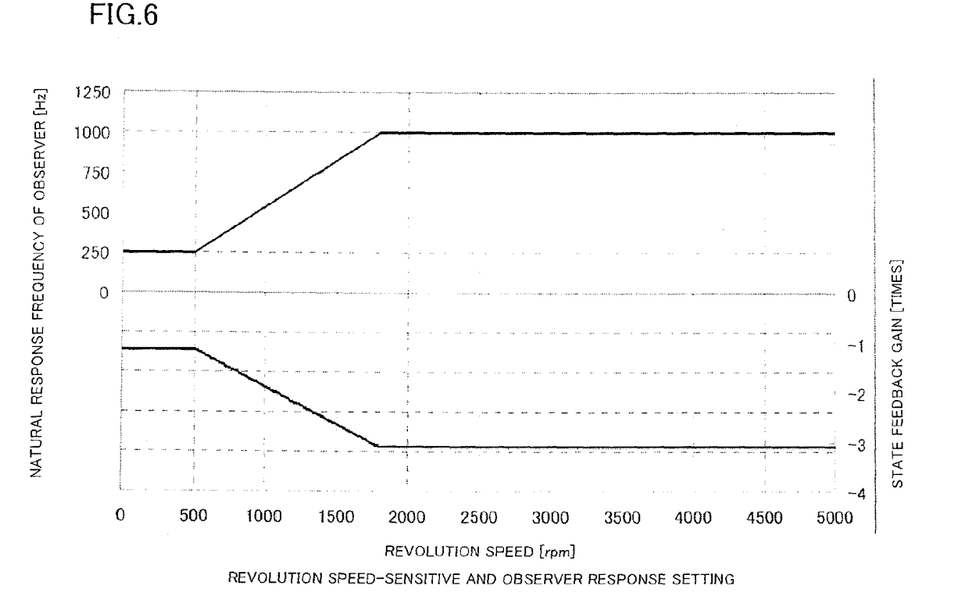
FIG. 6 is a diagram showing a characteristic of a state feedback gain of the motor control apparatus according to the second embodiment of the present invention.

As described above, in order to solve the problem that the response of the current estimating section 42 according to the first embodiment becomes insufficient at the time of a low-speed steering or a high-speed steering, the second embodiment varies a state feedback gain Ke of a state feedback section 428B of the current estimating section 42B in accordance with a variation in the steering speed. That is, as shown in FIG. 6, the second embodiment secures a good performance by increasing the state feedback gain Ke to absorb the modelization error at a time that the revolution speed of the motor 20 is high and decreasing the state feedback gain Ke to suppress the disturbance influence such as the current detection noises at a time that the revolution speed of the motor 20 is low.

Moreover, in order to solve the problem that the response of the adaptive identifying section 41 according to the first embodiment becomes insufficient in the abrupt parameter variations as described above, in this embodiment, the adaptive identifying section 41B provides an identification sensitivity gain $\Gamma_{dt}$ calculating section 417B, an identification sensitivity gain $\Gamma_u$ calculating section 416B and an identification sensitivity gain $\Gamma_x$ calculating section 415B at the front stages of an adaptive identification gain Kdt(t) calculating section 411B, an adaptive identification gain Ku(t) calculating section 412B and an adaptive identification gain Kx(t) calculating section 413B respectively, and adjusts the identification sensitivity gains $\Gamma_x$, $\Gamma_u$ and $\Gamma_{dt}$.

Figure 7:
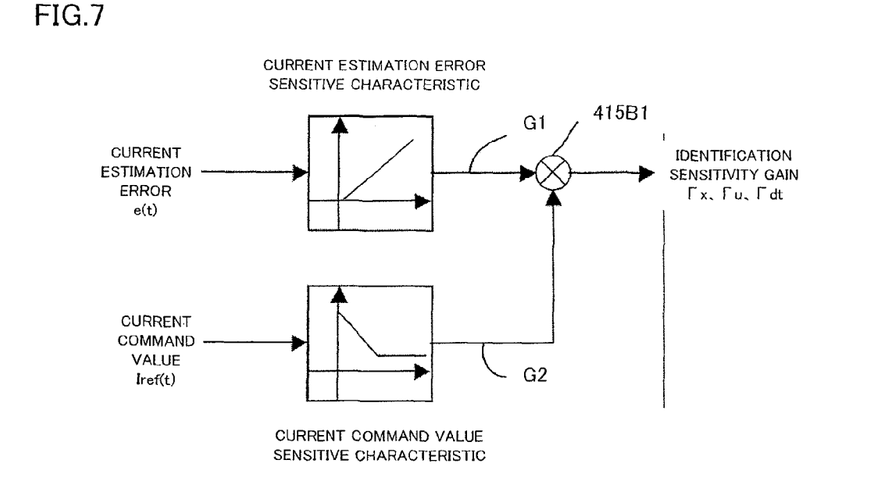
FIG. 7 is a block diagram showing an example of an identification sensitivity gain calculating section of the motor control apparatus according to the second embodiment of the present invention.
Figure 8:
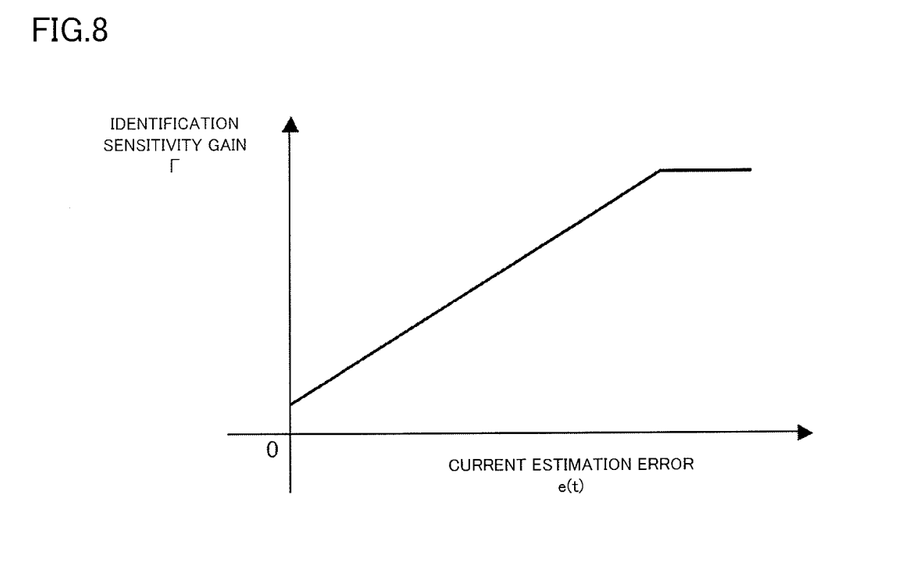
FIG. 8 is a diagram showing an example of a current estimation error sensitive characteristic of the identification sensitivity gain calculating section of the motor control apparatus according to the second embodiment of the present invention.
Figure 9:
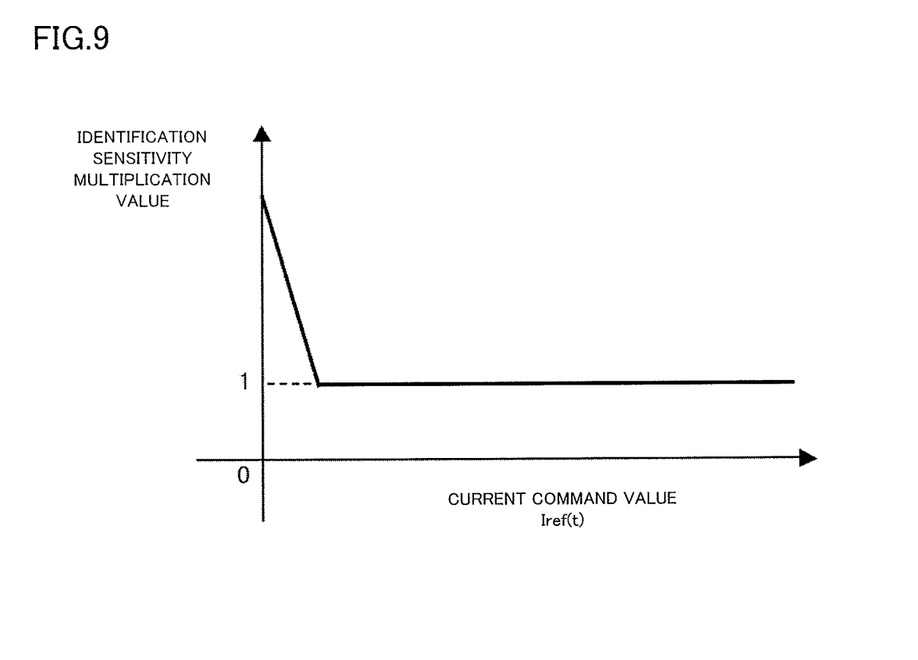
FIG. 9 is a diagram showing an example of a current command value sensitive characteristic of the identification sensitivity gain calculating section of the motor control apparatus according to the second embodiment of the present invention.

All of configurations of the identification sensitivity gain $\Gamma_{dt}$ calculating section 417B, the identification sensitivity gain $\Gamma_u$ calculating section 416B and the identification sensitivity gain $\Gamma_x$ calculating section 415B are identical, as shown in FIG. 7, the current estimation error e(t) and the current command value Iref(t) are inputted, by multiplying an identification sensitivity gain G1 obtained from a current estimation error sensitive characteristic shown in FIG. 8 based on the current estimation error e(t) by an identification sensitivity multiplication value G2 from a current command value sensitive characteristic shown in FIG. 9 based on the current command value Iref(t) in a multiplying section 415B1, the identification sensitivity gains $\Gamma_x$, $\Gamma_u$ and $\Gamma_{dt}$ are calculated.

In this way, depending on the current estimation error sensitive characteristic shown in FIG. 8, since decreasing the identification sensitivity gains $\Gamma_x$, $\Gamma_u$ and $\Gamma_{dt}$ in the case that the current estimation error e(t) is small, it is possible to suppress the disturbance influence such as the current detection noises. Further, since increasing the identification sensitivity gains $\Gamma_x$, $\Gamma_u$ and $\Gamma_{dt}$ in the case that the current estimation error e(t) is large, it is possible to quickly identify with respect to abrupt variations in parameters. Moreover, depending on the current command value sensitive characteristic shown in FIG. 9, since increasing the identification sensitivity gains $\Gamma_x$, $\Gamma_u$ and $\Gamma_{dt}$ in the case that the current command value Iref(t) is small, it is possible to keep the identification speed. Therefore, by comprising the identification sensitivity gain $\Gamma_{dt}$ calculating section 417B, the identification sensitivity gain $\Gamma_u$ calculating section 416B and the identification sensitivity gain $\Gamma_x$ calculating section 415B, it is possible to suppress the disturbance influence such as noises to secure a good performance while securing the current-estimation precision.

Third Embodiment

Depending on the method of the motor driving system, there is the case that a state that the detection of each phase motor current becomes impossible occurs. For example, in a downstream 1-shunt current detection method, in general, in order to detect each phase motor current, although a state that a single phase becomes on-state is made purposely in a PWM and the detection of each phase motor current is performed, there is the case of becoming a state that the detection of the phase current is impossible depending on the state of Duty (duty ratio) in the PWM, that is, a state that the current detection is impossible temporarily. In order to avoid such a phase current detection impossible state, usually limiting the Duty to drive, therefore, it is impossible to bring out a motor characteristic totally, and the efficiency is bad.

Since configurations described in Patent Documents 1 and 2 compensate variations in motor model parameters by a state feedback, in a state that the current detection is impossible, it is impossible to use the state feedback, and it becomes impossible to perform a control using a current-estimate value. However, the third embodiment of the present invention comprises an adaptive identification mechanism, directly identifies the parameter variations of the motor model including the manufacturing unevenness etc., and since temporarily terminates the adaptive identifying operation in the case of determining that the current detection is impossible, it is possible to perform a current estimation with a good precision even in a state that the current detection is impossible temporarily. As a method for terminating the adaptive identifying operation, it is possible to use methods such as setting the identification sensitivity gains $\Gamma_x$, $\Gamma_u$ and $\Gamma_{dt}$ as zero, and switching the current detection value i(t) to the current-estimate value i_hat(t).

Figure 10:
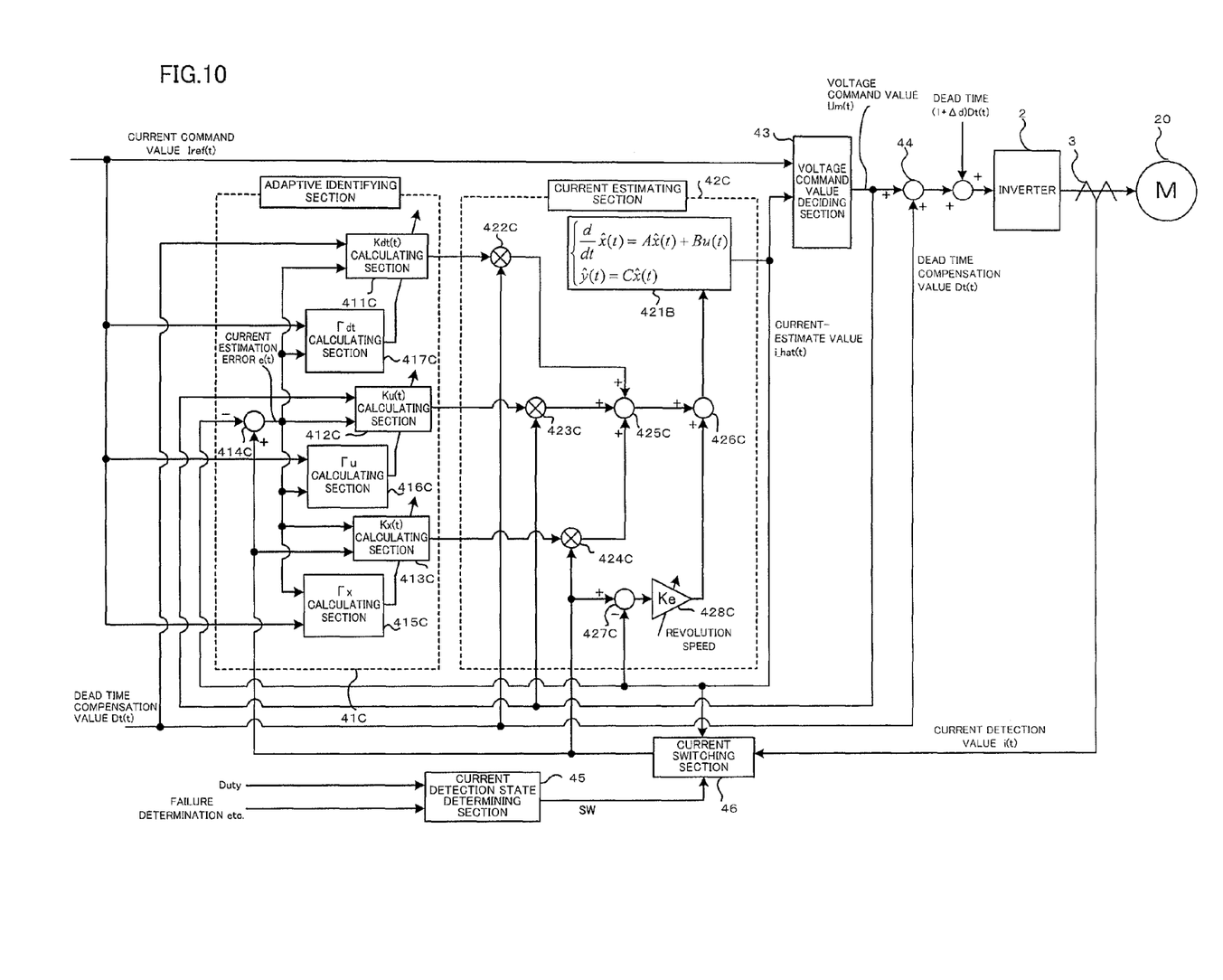
FIG. 10 is a block diagram showing an example of a motor control apparatus according to the third embodiment of the present invention.

A motor control apparatus shown in FIG. 10 can correspond to the above-described current detection impossible state, as a method for terminating the adaptive identifying operation temporarily, switching the current detection value i(t) to the current-estimate value i_hat(t) is used. Concretely, based on the motor control apparatus described in FIG. 5, a current detection state determining section 45 and a current switching section 46 are comprised. The current detection state determining section 45 determines whether the current detection is possible based on each phase Duty, a failure determination signal and so on or not, and inputs the determination result to the current switching section 46 as a determination signal SW. Here, in the case of determining that the current detection is possible, setting the determination signal SW as "1", on the other hand, in the case of determining that the current detection is impossible, setting the determination signal SW as "0".

The current switching section 46 inputs the determination signal SW, the current detection value i(t) and the current-estimate value i_hat(t), and inputs either the current detection value i(t) or the current-estimate value i_hat(t) to an adaptive identifying section 41C and a current estimating section 42C in accordance with the determination signal SW. In the case that the determination signal SW is "1", the current estimation error e(t) is obtained by directly using the detected current detection value i(t), and the adaptive identification is performed. On the other hand, in the case that the determination signal SW is "0", instead of the current detection value i(t), since the current-estimate value i_hat(t) is inputted to the adaptive identifying section 41C and the current estimating section 42C, the current estimation error e(t) becomes "0", the current estimation is maintained by using the parameter identification result before the current detection becomes impossible, and the motor control is maintained. Therefore, it is not necessary to limit the Duty and it is possible to bring out the motor characteristic totally.

Moreover, in a motor control apparatus that uses an identification rule that directly identifies the parameter itself of the motor 20 (for example, a direct identification method using a state variable filter) as the adaptive identification rule described in FIG. 4 of the first embodiment, since the current estimating section 42 does not use the current detection value i(t), it is possible to temporarily terminate the adaptive identification by setting the identification gain as "0" etc.

Figure 11:
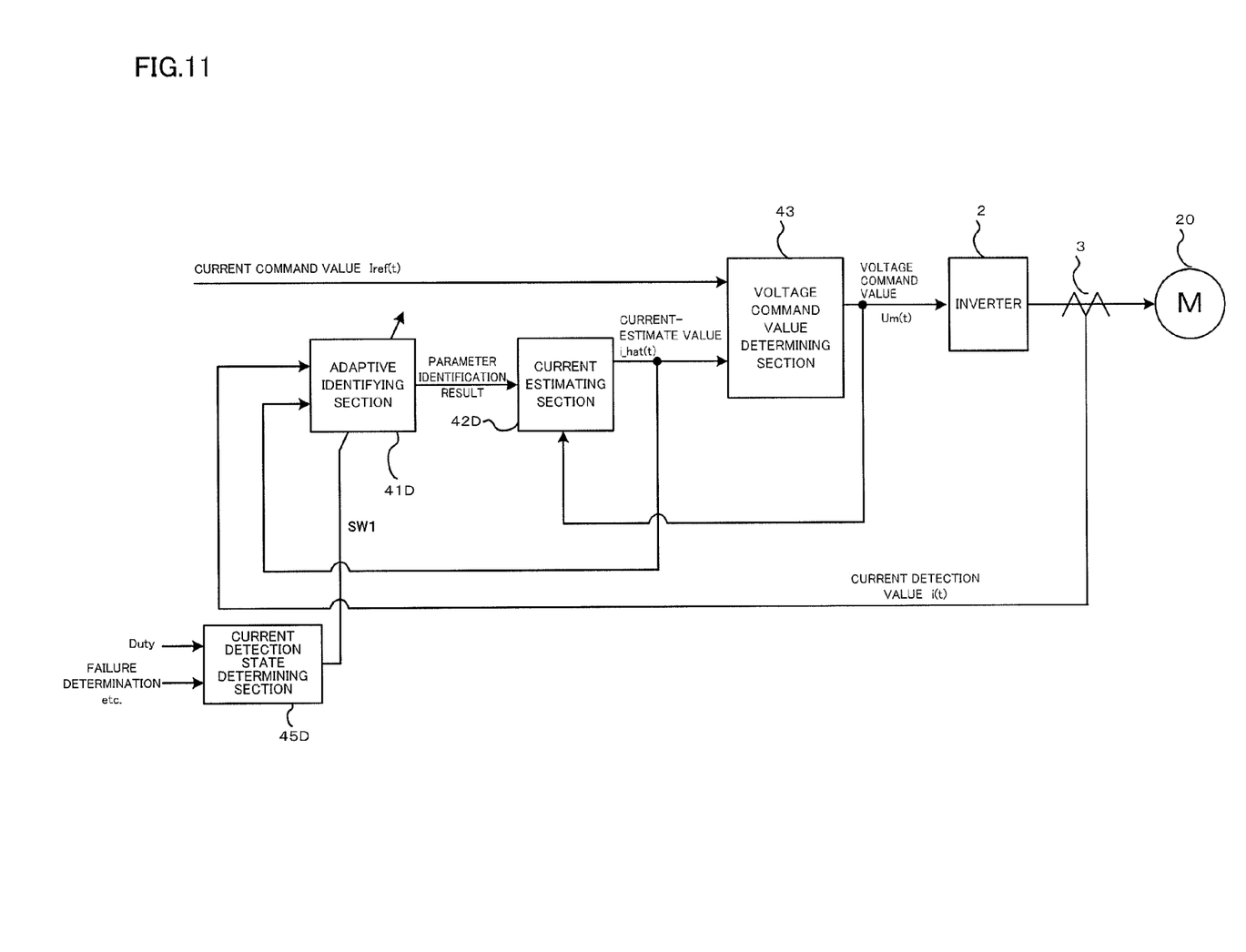
FIG. 11 is a schematic block diagram showing another example of the motor control apparatus according to the third embodiment of the present invention.

The concrete configuration, as shown in FIG. 11, comprises a current detection state determining section 45D, an adaptive identifying section 41D and a current estimating section 42D. The current detection state determining section 45D determines possible/impossible of the current detection based on each phase Duty, the failure determination signal and so on, and inputs a determination signal SW1 to the adaptive identifying section 41D. Here, in the case of determining that the current detection is possible, setting the determination signal SW1 as "1", on the other hand, in the case of determining that the current detection is impossible, setting the determination signal SW1 as "0".

In the case that the inputted determination signal SW1 is "1", the adaptive identifying section 41D obtains a parameter identification result based on the adaptive identification rule. In the case that the determination signal SW1 is "0", the adaptive identifying section 41D sets the identification gain $\Gamma_x$ as "0" to temporarily terminate the adaptive identification.

The current estimating section 42D inputs the parameter identification result of the adaptive identifying section 41D and the voltage command value Um(t), and calculates the current-estimate value i_hat(t).

Fourth Embodiment

Figure 12:
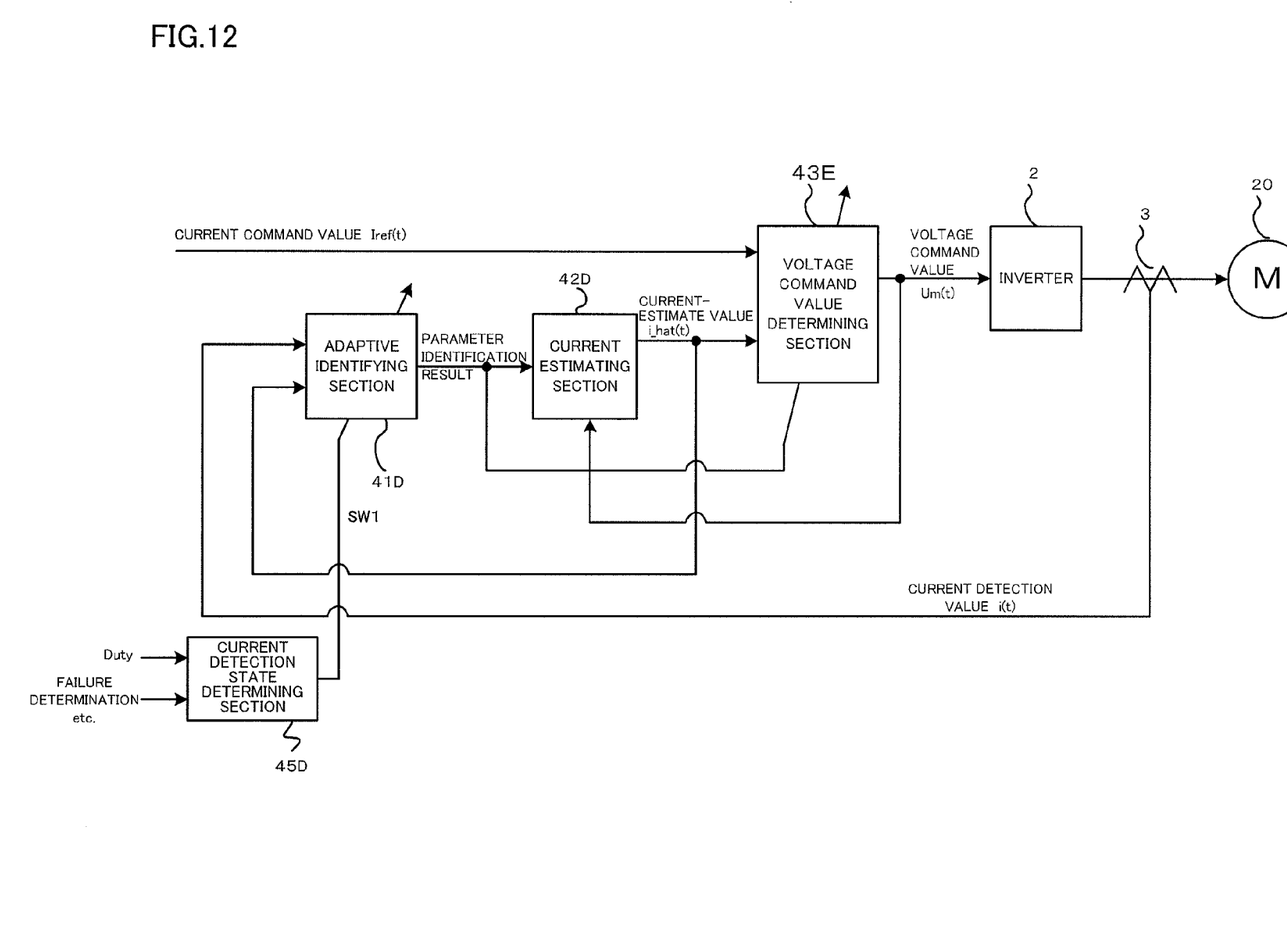
FIG. 12 is a schematic block diagram showing an example of a motor control apparatus according to the fourth embodiment of the present invention.

In the motor control apparatus shown in FIG. 11, although the voltage command value deciding section 43 decides the voltage command value Um(t) with respect to the current command value Iref(t) so as to become the response characteristic that the motor current desires, in the case that the parameter of the motor 20 varied, there is the case of not becoming the intended response characteristic. In order to solve this problem, as shown in FIG. 12, a voltage command value deciding section 43E is comprised. The voltage command value deciding section 43E inputs the parameter identification result obtained by the adaptive identifying section 41D and sequentially changes internal parameters of the voltage command value deciding section 43E based on the parameter identification result. In this way, it is possible to constantly obtain the desired response characteristic even with respect to parameter variations due to the temperature variation, the aging degradation and so on, and it is possible to improve the operation sound performance and the torque ripple performance.

Further, in this embodiment, although the voltage command value deciding section that sequentially changes the internal parameters based on the parameter identification result is provided at the motor control apparatus that uses an identification rule that directly identifies the parameter itself of the motor 20, the present invention is not limited to that, even with respect to the motor control apparatuses using the integral type adaptive identification rule that are described in FIG. 3, FIG. 5 and FIG. 10, and motor control apparatuses using a proportional-integral type adaptive identification rule and a least square adaptive identification rule, it is possible to apply the voltage command value deciding section that sequentially changes the internal parameters by using the parameter identification result calculated by the adaptive identifying section.

EXPLANATION OF REFERENCE NUMERALS 1 control section
2 inverter
41, 41A, 41B, 41C, 41D adaptive identifying section
42, 42A, 42B, 42C, 42D current estimating section
43, 43E voltage command value deciding section
45, 45D current detection state determining section
46 current switching section

The invention claimed is:

1. A motor control apparatus comprising:
a current detector for detecting a current of a motor; and
a controller for deciding a voltage command value based on at least a current command value,
wherein said controller comprising:
an adaptive identifying means for identifying parameter variations of an output model of said motor;
a current estimating means for estimating a current of said motor; and
a voltage command value deciding means for deciding said voltage command value, and
said adaptive identifying means performs said identification based on at least a current detection value detected by said current detector and a current-estimate value calculated by said current estimating means,
said current estimating means calculates said current-estimate value based on at least a result of said identification and said voltage command value, and said voltage command value deciding means decides said voltage command value based on said current command value and said current-estimate value.

2. A motor control apparatus according to claim 1, wherein parameters of said voltage command value deciding means are varied based on said result of said identification of said adaptive identifying means.

3. An electric power steering apparatus comprising a motor control apparatus according to claim 1.

4. A motor control apparatus according to claim 1, wherein said controller further includes a current detection state determining means for determining whether a current detection of said motor by said current detector is possible or not, in a case that said current detection state determining means determines said current detection is impossible, said identification of said adaptive identifying means is terminated temporarily.

5. A motor control apparatus according to claim 4, wherein said controller further includes an inverter for driving said motor based on said voltage command value,
a current detection method of said motor is a 1-shunt current detection method that arranges a single said current detector at an upper stage or a lower stage of said inverter, and said current detection state determining means determines whether said current detection of said motor is possible or not based on at least duty-command values.

6. A motor control apparatus according to claim 5, wherein responses of said adaptive identifying means and said current estimating means are varied based on an operation state of said motor.

7. A motor control apparatus according to claim 1, wherein responses of said adaptive identifying means and said current estimating means are varied based on an operation state of said motor.

8. A motor control apparatus according to claim 7, wherein parameters of said voltage command value deciding means are varied based on said result of said identification of said adaptive identifying means.

* * * * *